United States Patent [19]
Raitzer et al.

[11] Patent Number: 5,115,891
[45] Date of Patent: May 26, 1992

[54] COMPOSITE BRAKE DRUM WITH IMPROVED LOCATING MEANS FOR REINFORCEMENT ASSEMBLY

[75] Inventors: Donald A. Raitzer, Farmington Hills; Raymond J. Twisdom, Warren, both of Mich.

[73] Assignee: The Budd Company, Troy, Mich.

[21] Appl. No.: 628,464

[22] Filed: Dec. 17, 1990

[51] Int. Cl.⁵ .............................................. F16D 65/10
[52] U.S. Cl. .................................. 188/218 R; 164/112
[58] Field of Search ..................... 188/255, 218 R, 26, 188/17, 18 R; 164/112, 111

[56] References Cited

U.S. PATENT DOCUMENTS

| | | | |
|---|---|---|---|
| 1,374,509 | 4/1921 | Lomax | 164/112 X |
| 1,947,782 | 2/1934 | Lejeune | 188/218 |
| 2,081,605 | 5/1937 | Sinclair | 188/218 R |
| 2,111,709 | 3/1938 | Van Halteren | 188/218 |
| 2,201,445 | 5/1940 | Miller et al. | 188/218 |
| 2,316,029 | 4/1943 | Van Halteren et al. | 29/152.2 |
| 2,844,229 | 7/1958 | Whitfield | 188/218 R |
| 2,978,073 | 4/1961 | Soddy | 188/218 |
| 3,005,259 | 10/1961 | Benya et al. | 29/505 |
| 3,016,269 | 1/1962 | De Lorean | 188/218 R X |
| 3,410,606 | 11/1968 | Benton et al. | 164/111 X |
| 3,452,843 | 7/1969 | Smith | 188/218 |
| 3,841,448 | 10/1974 | Norton, Jr. | 188/218 R |
| 4,262,407 | 4/1981 | Petersen et al. | 29/460 |
| 4,266,638 | 5/1981 | Petersen et al. | 188/218 R |
| 4,858,731 | 8/1989 | Bush | 188/218 R |

FOREIGN PATENT DOCUMENTS 472398 3/1951 Canada .
1101209 3/1954 France .

Primary Examiner—Robert J. Oberleitner
Assistant Examiner—Josie A. Ballato
Attorney, Agent, or Firm—Harness, Dickey & Pierce

[57] ABSTRACT

A composite brake drum particularly adapted for motor vehicle applications. The brake drum includes a reinforcement assembly enclosed within the cylindrical portion of the drum. The reinforcement assembly is preferably made from steel wire stock and includes a plurality of circular loops spaced axially within the brake drum cylindrical portion. Axially extending locator wires are mechanically fastened to the reinforcing loops and serve to locate the loops. End portions on the locator wire contact only one of the mold halves forming the mold cavity and enable the device to be essentially self-locating without crossing the parting line of the mold. By not crossing the parting line, the position of the loops is maintained within acceptable tolerance limits from the finished friction surface of the drum.

19 Claims, 3 Drawing Sheets

COMPOSITE BRAKE DRUM WITH IMPROVED LOCATING MEANS FOR REINFORCEMENT ASSEMBLY

This is a continuation in part of U.S. patent application Ser. No. 623,330, filed Dec. 7, 1990 now abandoned.

BACKGROUND AND SUMMARY OF THE INVENTION

This invention relates to a brake drum particularly adapted for motor vehicles and being reinforced with an embedded reinforcement member to provide a composite structure.

Brake drums used for motor vehicles such as heavy duty trucks are typically formed by casting grey iron and machining the casting in areas where precision dimensions and surfaces are required. Although iron brake drums perform satisfactorily, designers of braking systems are constantly striving for enhanced performance, lower cost, increased fatigue life and lighter weight. One particular shortcoming of conventional all-iron drums is their susceptibility to heat checking and crack formation which can ultimately lead to failure of the drum.

As a means for providing an improved brake drum, composite structures are known in which steel is incorporated into an iron brake drum for reinforcement. For example, in accordance with U.S. Pat. No. 2,316,029, a bell-shaped stamped sheet metal housing is provided having an iron inner portion centrifugally cast in place to form the friction surface of the drum. Although drums of this construction operate satisfactorily, the location of the steel reinforcing layer is not optimized since the higher bending stresses imposed on the brake drum by the brake shoes are very close to the inside cylindrical surfaces of the braking surface where the reinforcement of steel can be most advantageously used. Moreover, the process of manufacture of such a drum would require specialized machinery and processing steps.

Another approach used in the past is to provide an externally applied reinforcing member such as a steel band as taught by U.S. Pat. No. 3,841,448. This approach also requires specialized fabrication equipment and further does not optimally locate the steel reinforcing member. Moreover, the interface surfaces between the drum and reinforcement need to be precision machined and providing a good bond between the parts can be difficult.

A steel wire ring is embedded within an iron brake drum structure according to U.S. Pat. No. 2,111,709. Although this structure would likely provide improvements over an all-iron brake drum according to the prior art, the reinforcement provided by the single ring is positioned only to reinforce the open mouth of the brake drum. In addition, no means for positioning the reinforcing member during the molding process is disclosed by this patent. The large cross-sectional area of a single reinforcing ring could further lead to poor bonding between the iron and steel ring due to the heat sink imposed by the ring.

The brake drum according to U.S. Pat. No. 4,858,731, which is commonly assigned to the assignee of the present invention, employs a cage-like reinforcement assembly made from steel wire which is cast in place to be substantially embedded within a grey iron brake drum. Locating wires are provided to position the reinforcement structure with respect to the mold cavity during casting. Since the steel material of the reinforcing assembly has a considerably higher modulus of elasticity than grey iron, the reinforcement increases the strength of the composite drum structure, thus decreasing mechanical deflection in response to loading. Although this brake drum makes improvements over previous drums, the locator wires of the reinforcement structure locate on both of the two mold halves when positioning the reinforcement structure. In this regard, the locator wires cross the parting line of the mold and present problems in terms of maintaining tolerances in the positioning of the reinforcement structure relative to the machined, loading or friction surface of the drum.

Additionally, the interior ends of the locator wires were required to have precise diameters in that this end was required to contact both mold halves. Furthermore, Applicant's prior design tended to cause sand from the casting molds to be scraped free as the two mold halves are put together, leading to imperfections in the final product.

In accordance with this invention, an improved composite brake drum is provided which exhibits a number of significant benefits over previous cast brake drums. The brake drum according to this invention employs a cage-like reinforcement assembly, preferably made from steel wire, which is cast in place to be substantially embedded within a grey iron brake drum. Specifically, the present invention offers an improvement in the locating and positioning of the reinforcement assembly relative to the machined, loading or braking surface of the drum. The locating means of the present invention accurately positions the reinforcement assembly with respect to one mold half during casting and therefore, neither crosses the parting line of the mold nor requires spanning the separation of the mold halves at the locating end. Thus, properly positioned, the reinforcement assembly eliminates the tolerance problems which lead to reduced drum life.

The locating means also allows for easy reforming and fine tuning of the reinforcement assembly prior to mounting within the mold. This further assures accurate positioning of the reinforcement assembly.

The present invention is additionally beneficial in that it allows green casting sand, which has been scraped or dislodged from the mold during positioning of the reinforcement assembly, to be cleared from the mold cavity before the mold is closed for actual casting. With the present reinforcement assembly contacting only one mold half, upon closing of the mold, additional casting sand will not be scraped from the second mold and the mold cavity will remain free from contaminants, upon closing of the mold. With the free or loose sand removed, the porosity of the casting is reduced and the strength of the drum proportionally increased.

The reinforcement assembly also reduces the generation of surface checks and cracks which can propagate and ultimately cause mechanical failure of the brake drum. The increased strength of the composite further enables a reduction in the quantity of iron that is required to produce a brake drum of given strength, thus resulting in a lighter weight brake drum structure. The reinforcement assembly further results in the reinforcing sections being positioned close to the machined friction surfaces of the drum within tolerances required for the most advantageous structural efficiency. The axial aspect of the reinforcing assembly serves to reinforce the brake drum across the entire depth of the friction surface. Significantly, the composite brake drum according to this invention can be fabricated using conventional sand casting processes with minimal variations, thus saving the cost of retooling. Due to the fact that the metal reinforcing sections of this invention are distributed, relatively small diameter wires can be used which in turn enable the wires to be rapidly heated to temperatures near those of the molten iron being poured into the casting mold. Thus, good fusion between the iron and embedded steel reinforcement is promoted and casting cycle time is reduced.

Additional benefits and advantages of the present invention will become apparent to those skilled in the art to which this invention relates from the subsequent description of the preferred embodiments and the appended claims, taken in conjunction with the accompanying drawings.

DETAILED DESCRIPTION OF THE INVENTION

Figure 1:
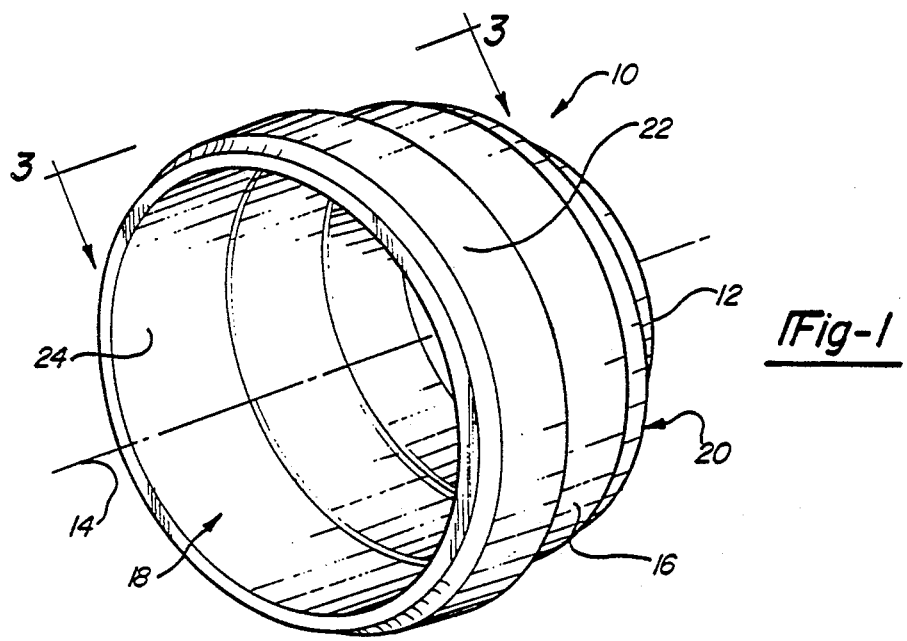
FIG. 1 is a perspective view of a composite motor vehicle brake drum structure constructed in accordance with this invention.
Figure 2:
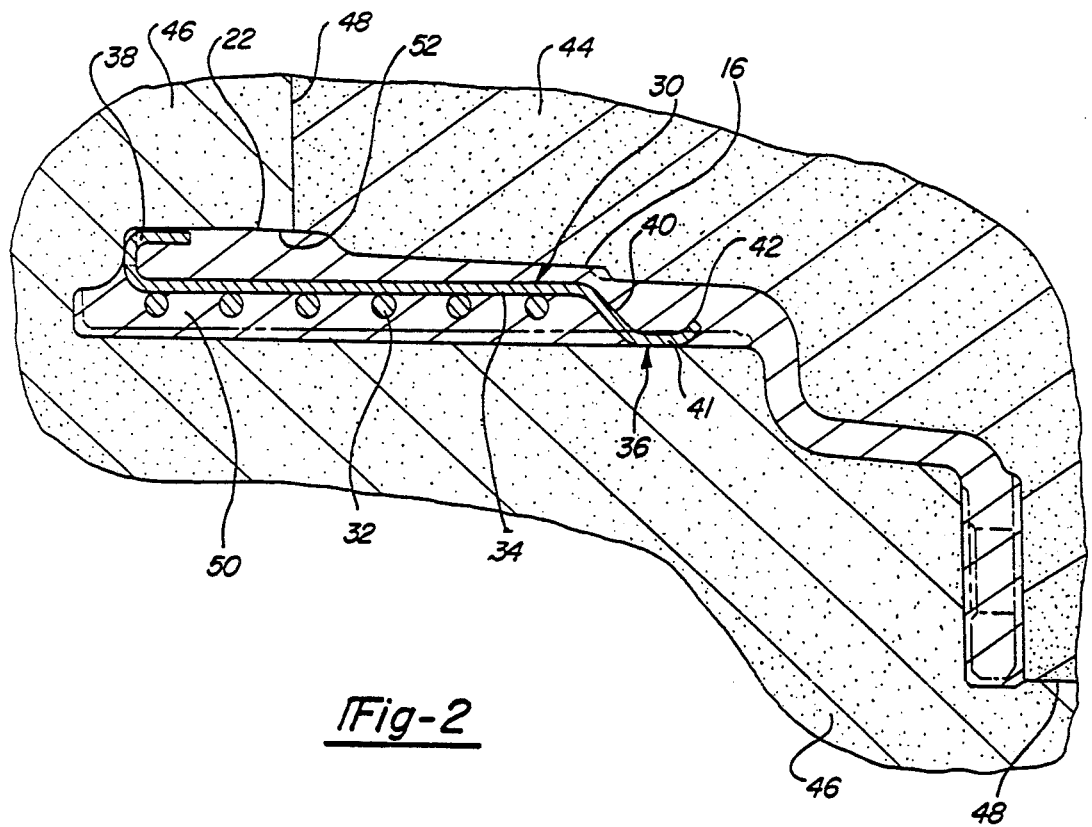
FIG. 2 is a cross-sectional view generally showing a portion of the brake drum as it is formed through casting processes.
Figure 3:
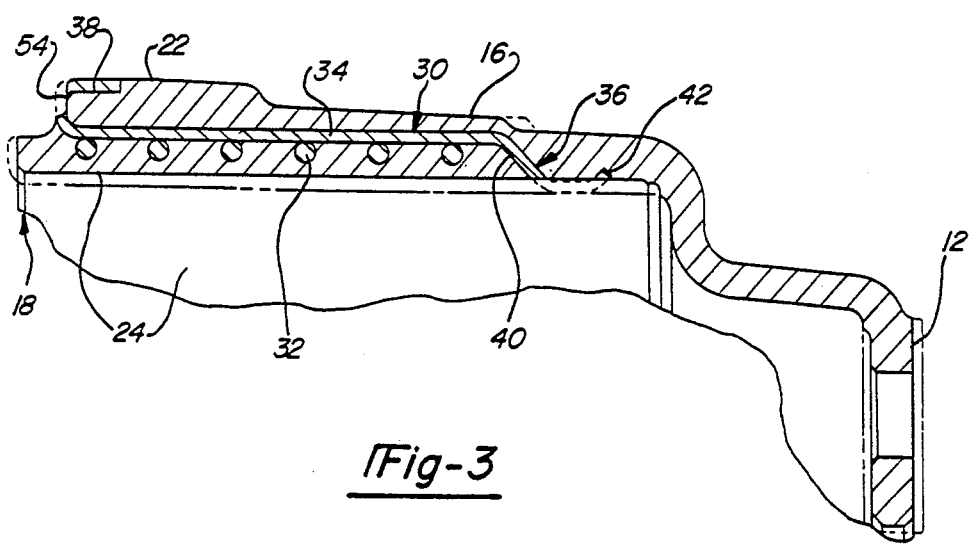
FIG. 3 is a cross-sectional view generally taken along line 3—3 in FIG. 1 showing the composite brake drum after finished machining operations.

A composite brake drum in accordance with this invention is best shown in FIGS. 1 through 3 and is generally designated by reference number 10. Drum 10 has a mounting plate portion 12 configured to enable drum 10 to be mounted to a motor vehicle axle structure (not shown) for rotation about an axis of rotation 14. The mounting plate portion 12 merges into a cylindrical side portion 16, thus forming an open end 18 and a closed end 20. A so-called "squeal band" 22, formed with the outside surface of the cylindrical side portion 16, is positioned adjacent the open end 18 and is a radially thickened portion of the brake drum 10. The inside cylindrical friction surface 24 of the drum 10 is engaged by expanding the brake shoes of a conventional drum type braking system. In describing the present invention, the terms "inward" and "outward" are to be interpreted relative to the inside and outside of the drum 10. For example, the inward direction will be generally towards the inside cylindrical friction surface 24. Likewise, the outward direction will be generally toward the cylindrical side portion 16 and the squeal band 22.

Figure 4:
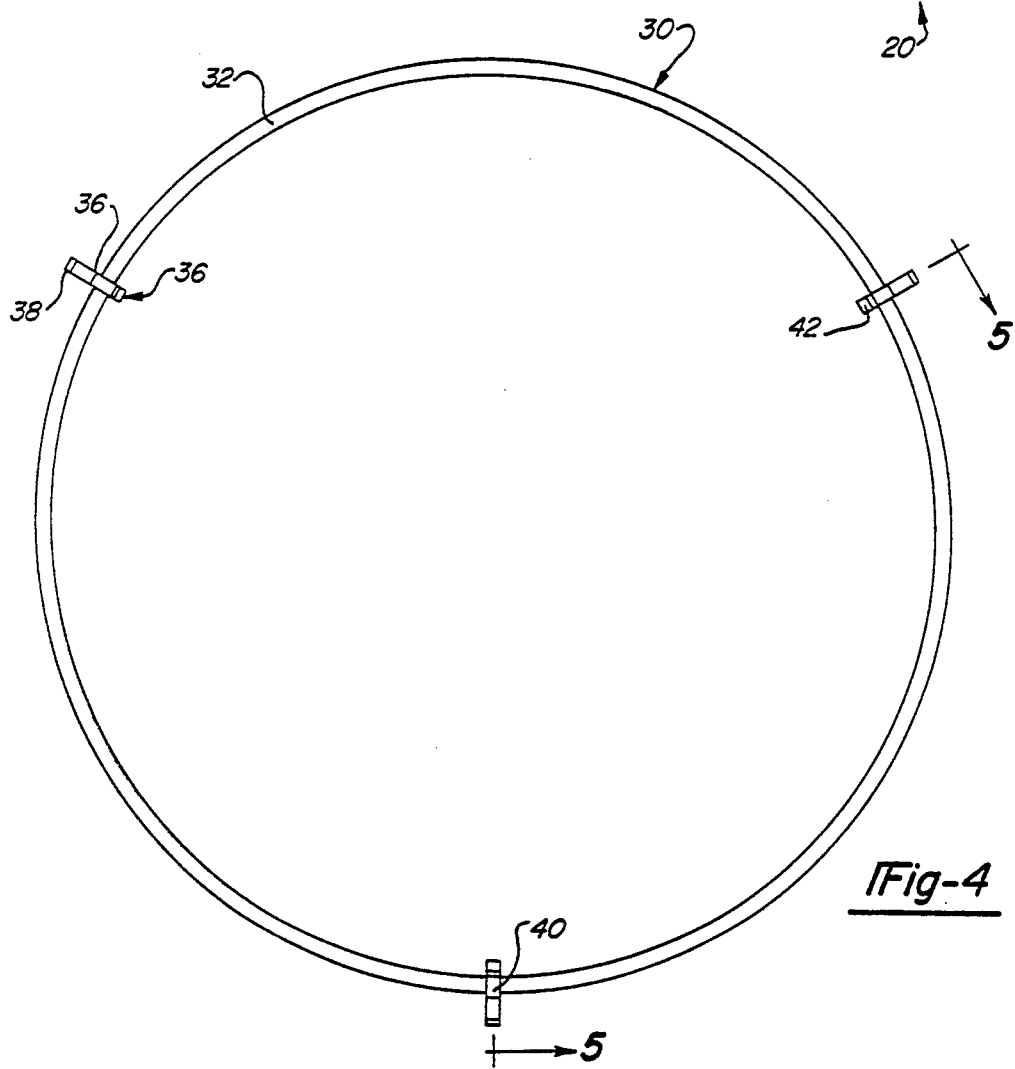
FIG. 4 is a side view of a reinforcement assembly according to this invention.
Figure 5:
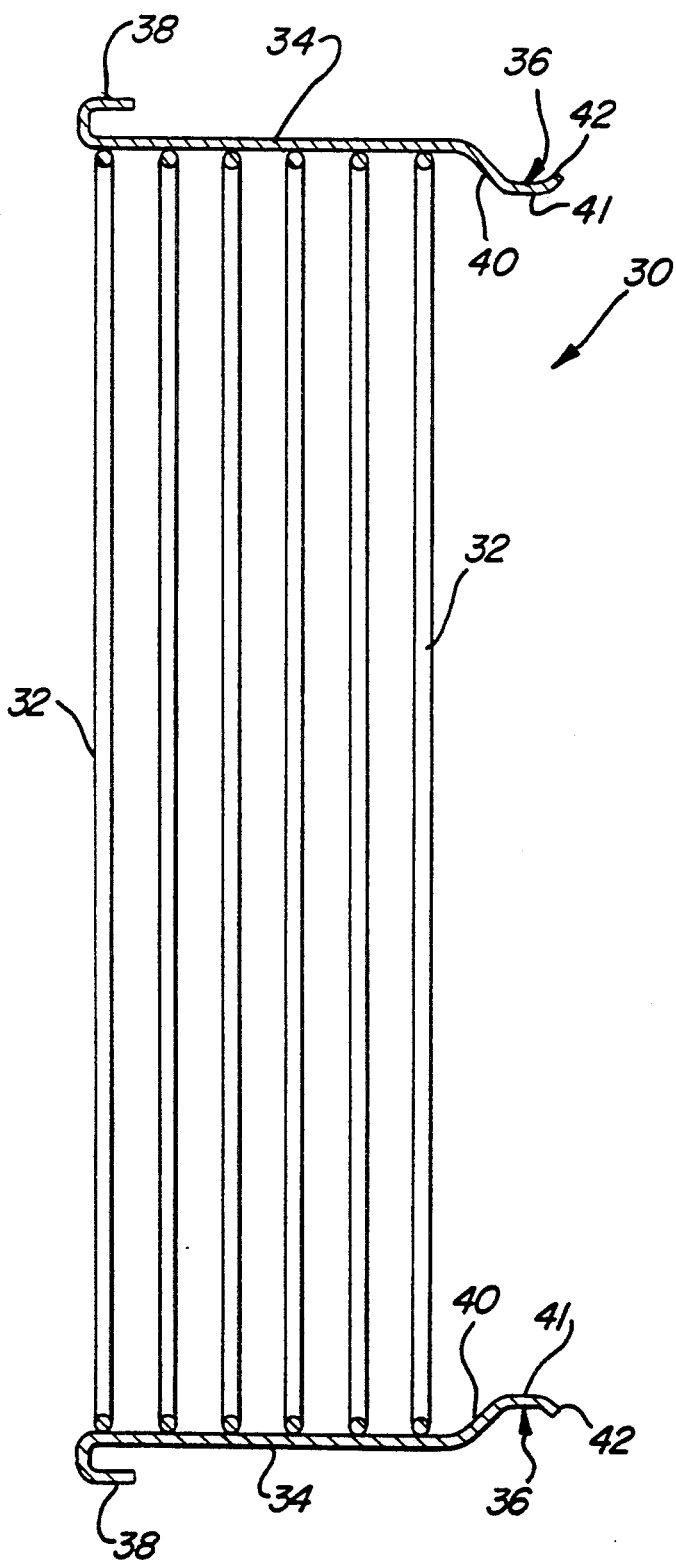
FIG. 5 is a cross-sectional view taken along line 5—5 of FIG. 4 showing a reinforcement structure embodying the principles of the present invention.

FIGS. 4 and 5 illustrate the configuration of a reinforcement assembly 30 in accordance with this invention. The reinforcement assembly 30 includes a plurality (six shown) of closed circular wire rings 32 made of steel wire stock. While individual rings are employed in the present embodiment, a single continuously wrapped wire, forming loops in a general helical shape could also be used.

Axially extending locator wires 34 are provided at circumferentially displaced positions as shown in FIG. 4. The locator wires 34 are bonded or otherwise affixed to the rings 32, for example, by brazing, welding, soldering, adhering or by forming them integrally. Locator wires 34 have a radially outwardly turned looped or ringed end 38 at one axial end and a generally offset contact portion 36 at the opposing end. The offset portion 36 is offset by a riser 40 which extends generally radially inward of the axial extending locator wire 34 toward the axis of rotation 14. A contact segment 41 of the offset portion 36 then continues in a generally axial direction until terminating in an outwardly directed toe or ski-nose 42. As such, the contact portion 36 exhibits a generally outwardly concave shape. As shown in FIG. 2, the brake drum 10 is cast within a pair of sand cast molds halves 44 and 46 which are separated at parting line 48 and define a mold cavity 50 whose surface forms the outer shape of the brake drum 10. As shown, the reinforcement assembly 30 is positioned within the mold cavity 50 such that offset portion 36, in particular the axial extension of the contact segment 41, is in contact with only the first or male mold half 46 and the loop 38 is fitted within a pocket 52 formed in the male mold half 46 for developing a portion of the squeal band 22.

In previous brake drums, the position of the reinforcement assembly was gaged from both of the mold halves. This resulted in it being possible for the position of the reinforcement assembly to vary along its length from the desired spacing distance, a distance measured from the friction surface, producing a non-uniform strength across the drum. The present invention overcomes this deficiency.

The reinforcement structure 30 is positioned and mounted so as to reference the location and position of the rings 32 only with respect to the male mold half 46. Accordingly, the reinforcement structure 30 is fully positioned prior to the second or female mold half 44 being assembled or closed onto the male mold half 46. By limiting contact of the locating wires 34 to only the male mold half 46, the reinforcement assembly 30 does not traverse the parting line 48 as it is positioned within the mold cavity 50 (i.e. the locator wire 34 does not extend from the first mold half 46 thereafter contacting the second mold half 44). By not crossing the parting line 48, the positioning of the rings 32 is more accurately held relative to the braking surface. As seen in FIGS. 2 and 3, by referencing the reinforcement assembly 30 to only the male mold half 46, the rings 32 are more accurately positioned relative to the raw cast of the friction surface 24. As such, the friction surface 24 can be machined and finished while maintaining the rings 32 within the acceptable tolerances, thereby providing optimum and equally distributed strength within the composite drum 10.

Since the locating wires 34 engage only the first mold half 46, it is possible to provide for a clean mold cavity 50, one absent of free or loose sand, for casting the drum 10. Whenever the reinforcement assembly 30 contacts the walls of the mold cavity, an amount of mold sand is scraped free at the place of contact. This occurs at each contact area. In the present invention, the reinforcement assembly is positioned over the male mold half 46 and the assembly 30 contacts the male mold half 46 with the opposing ends of the locator wires 34. During the positioning of the reinforcement assembly 30, any amount of sand that would be scraped free is reduced by the elongated contacted segment 41 and ski-nose 42 of the offset portion 36 being connected to the remainder of the locator wire 34 by an axially and radially extending riser 40. As the reinforcement assembly is moved into its proper position, the contact segment 41 is able to slide along the mold half 46 with a rail or sledding action. In this manner, the terminal end or ski-nose 42 prohibits the contact segment 41 from being driven into the mold half 46.

Prior to the positioning of the female mold half 44 over the male mold half 46, any free sand then present in the mold cavity 50 can be cleared to provide a clean mold cavity 50 for improved casting integrity. Typically, the sand is blown clear of the cavity 50. During casting, any free sand remaining within the mold cavity 50 will result in a contaminated casting having increased defects and reduced strength. Since the locator wires 34 will not contact the female mold half 44, the female mold half 44 may be brought into position without any additional sand being released into the cavity 50. Molten iron can now be poured into the mold cavity 50 to substantially embed the reinforcement assembly 30 while readily controlling the porosity to increase the strength of the drum 10.

The offset shape of the offset contact portion 36 also allows for fine tuning or reforming of the reinforcement assembly 30 immediately prior to casting. By positioning the reinforcement assembly 30 over a solid duplicate of the mold, the orientation of the reinforcement assembly 30 can be readily checked and adjusted if necessary.

FIG. 3 is a cross-sectional view through the brake drum 10 after finish machining operations are completed. The phantom lines show the outline of the raw casting of the drum 10. As shown, the friction surface 24 is machined to form an accurate inside bore, this involves machining away the contact segment 41. Although iron is a superior material for forming the friction surface 24, the minute cross-sectional area of exposed steel caused by machining into the offset portion 36 does not produce adverse consequences along the interior surface. The rim surface 54 may be machined away causing a portion of the loop 38 to be removed.

In previous designs, the locating ends were required to be embedded into and could disrupt the exterior surface of the cylindrical side portion 16. Since the exterior surface is subjected to extensive stress loading, it is desirable to eliminate the stress concentration induced by the presence of the machined locator ends along that surface. Additionally, the previously mentioned critical diameter is no longer necessary.

The structural benefits provided by the composite brake drum 10, as compared with conventional cast brake drums, are manyfold. The ultimate tensile strength of grey iron is much less than that of steel and, accordingly, the steel of the reinforcement assembly 30 provides enhanced mechanical strength for the drum. The structure is also stiffer since the modulus of elasticity for steel is about twice that of grey iron (i.e., 30 million psi and 15 million psi, respectively). Due to the increased modulus of elasticity of steel, the steel carries a disproportionately high fraction of the total load exerted on the brake drum as compared with its cross-sectional area. Accordingly, when steel is substituted for grey iron within the brake drum 10, the stress in the iron will be reduced and the stiffness of the composite will be enhanced as compared to a drum formed of iron alone. The benefits to be derived from such a composite structure include a reduction in the brake actuator travel of a vehicle and a higher tolerance to brake lining wear. In addition, the reduction in stress retards crack initiation and propagation.

The configuration of the reinforcement assembly 30 in accordance with this invention further provides structural benefits in that the rings 32 are located close to the friction surface 24 and can readily be held within acceptable tolerances. Although stresses are applied onto a brake drum in numerous directions, a significant load is exerted on the cylindrical side portion 16 of the drum 10 in response to the radially outward travel of the brake shoes. Such a load places a tensile stress along the friction surface 24 and a tensile stress on the outer radial surface of the drum side portion 16. The steel making up the rings 32 has excellent tensile strength in extension and, with the positioning of the rings 32 in close proximity to the friction surface 24, such forces are far better restrained than in ordinary grey iron, which has a fairly low extension tensile strength. By positioning the rings 32 substantially equidistantly from the friction surface 24 along the surface's length, the strength of the composite brake drum 10 is uniformly increased across the friction surface 24. Disjunctions in strength could result in the drum 10 exhibiting an increased susceptibility to fatigue.

While the above description constitutes the preferred embodiments of the present invention, it will be appreciated that the invention is susceptible to modification, variation and change without departing from the proper scope and fair meaning of the accompanying claims.

What is claimed is:

1. A composite brake drum for a motor vehicle comprising:
    a mounting plate portion for mounting said drum to a motor vehicle axle structure for rotation about an axis of rotation;
    a cylindrical side portion joining said mounting plate portion and defining an open end and a closed end of said drum and forming an inside cylindrical braking friction surface, said cylindrical side portion having a reinforcing structure substantially embedded therein and including at least two rings extending circumferentially about said drum and being coaxial with said axis of rotation, said rings also being connected together and axially spaced relative to said axis of rotation by at least two axially extending locator wires having ends for positioning said reinforcing structure within said cylindrical side portion, at least one end of said locator wires extending axially beyond said rings and contacting only said inside cylindrical braking friction surface.

2. A composite brake drum as set forth in claim 1 wherein said axially extending locator wire end includes a generally concave contact portion for contacting said inside cylindrical braking friction surface, said concave contact portion being open in a direction outward from said axis of rotation.

3. A composite brake drum as set forth in claim 2 wherein said contact portion includes a riser extending angularly inward from said rings toward said axis of rotation, said riser being connected to a contact segment having a generally axially extending portion for contacting said inside cylindrical braking friction surface.

4. A composite brake drum as set forth in claim 3 wherein said contact segment terminates in an angularly outward extending end.

5. A composite brake drum as set forth in claim 1 wherein one end of said locator wires forms a ringed end contacting said inside cylindrical braking friction surface and positioning said reinforcing structure in said cylindrical side portion.

6. A composite brake drum as set forth in claim 1 wherein said reinforcing structure includes three locator wires equidistantly spaced about said rings.

7. A composite brake drum as set forth in claim 1 wherein said rings are axially spaced apart such that one of said rings is adjacent said open end and another of said rings is adjacent said closed end of said drum.

8. A composite brake drum as set forth in claim 7 wherein said reinforcing structure includes six rings.

9. A composite brake drum as set forth in claim 1 wherein said rings are formed steel wire.

10. A composite brake drum as set forth in claim 1 wherein said locator wires are welded to said rings.

11. A composite brake drum for a motor vehicle comprising:
a mounting plate portion for mounting said drum to a motor vehicle axle structure for rotation about an axis of rotation;
a cylindrical side portion joining said mounting plate portion and defining an open end and a closed end of said drum and forming a raw cast inside cylindrical braking friction surface, said cylindrical side portion having a reinforcing structure substantially embedded therein and including at least two rings extending circumferentially about said drum and being coaxial with said axis of rotation, said rings also being connected together and axially spaced relative to said axis of rotation by at least two axially extending locator wires having ends for positioning said reinforcing structure within said cylindrical side portion, at least one end of said locator wires extending axially beyond said rings and contacting only said raw cast inside cylindrical braking friction surface.

12. A composite brake drum as set forth in claim 11 wherein said axially extending locator wire end includes a generally concave contact portion for contacting said raw cast inside cylindrical friction braking surface, said concave contact portion being open in a direction looking outward from said axis of rotation.

13. A composite brake drum as set forth in claim 12 wherein said contact portion includes a riser extending angularly inward from said rings toward said axis of rotation, said riser being connected to a contact segment having a generally axially extending portion for contacting said raw cast inside cylindrical braking friction surface.

14. A composite brake drum as set forth in claim 13 wherein said contact segment terminates in an angularly outward extending end.

15. A composite brake drum as set forth in claim 13 wherein said reinforcing structure includes three locator wires equidistantly spaced about said rings.

16. A composite brake drum as set forth in claim 13 wherein said rings are axially spaced apart such that one of said rings is adjacent said open end and another of said rings is adjacent said closed end of said drum.

17. A composite brake drum as set forth in claim 13 wherein said reinforcing structure includes six rings.

18. A composite brake drum as set forth in claim 13 wherein said rings are formed steel wire.

19. A composite brake drum as set forth in claim 13 wherein said locator wires are welded to said rings.

* * * * *